(12) United States Patent
Jang et al.

(10) Patent No.: US 11,196,296 B2
(45) Date of Patent: Dec. 7, 2021

(54) WIRELESS POWER TRANSMISSION SYSTEM FOR ROTATING CONNECTOR

(71) Applicant: AMOSENSE CO.,LTD., Cheonan-si (KR)

(72) Inventors: Kil Jae Jang, Seongnam-si (KR); Bo Hyeon Han, Goyang-si (KR)

(73) Assignee: Amosense Co., Ltd., Cheonan-si (KR)

( * ) Notice: Subject to any disclaimer, the term of this patent is extended or adjusted under 35 U.S.C. 154(b) by 0 days.

(21) Appl. No.: 17/040,808

(22) PCT Filed: Apr. 22, 2019

(86) PCT No.: PCT/KR2019/004802
§ 371 (c)(1),
(2) Date: Sep. 23, 2020

(87) PCT Pub. No.: WO2019/208983
PCT Pub. Date: Oct. 31, 2019

(65) Prior Publication Data
US 2021/0057933 A1 Feb. 25, 2021

(30) Foreign Application Priority Data
Apr. 26, 2018 (KR) .................. 10-2018-0048412

(51) Int. Cl.
H01F 27/42 (2006.01)
H01F 37/00 (2006.01)
(Continued)

(52) U.S. Cl.
CPC ............ *H02J 50/10* (2016.02); *F25D 23/028* (2013.01); *H01F 27/25* (2013.01); *H02J 50/005* (2020.01);
(Continued)

(58) Field of Classification Search
CPC . H02J 5/005; H02J 7/025; H02J 17/00; H01F 38/14; B60L 11/182
(Continued)

(56) References Cited

U.S. PATENT DOCUMENTS

2010/0156193 A1\* 6/2010 Rhodes ................ H04B 5/0025
307/104
2010/0271296 A1\* 10/2010 Kopychev ............. H02J 50/005
345/156
(Continued)

FOREIGN PATENT DOCUMENTS

CN 102882283 A 1/2013
JP 2010112572 A 5/2010
(Continued)

OTHER PUBLICATIONS

International Search Report cited in PCT/KR2019/004802 dated Aug. 13, 2019, 2 pages.
(Continued)

*Primary Examiner* — Quan Tra
(74) *Attorney, Agent, or Firm* — Rothwell, Figg, Ernst & Manbeck, P.C.

(57) ABSTRACT

Provided is a wireless power transmission system for a rotating connector. A wireless power transmission system for a rotating connector according to an embodiment of the present invention comprises: a wireless power transmission module comprising a first magnetic core and a first coil, provided on a fixed first connector, and using the power thereof to generate a magnetic field and transmit wireless power; and a wireless power receiving module comprising a second magnetic core and a second coil, and provided on a second connector, which is rotatably connected to the first connector, to receive the transmitted wireless power and supply same to the second connector. The first and second
(Continued)

magnetic cores are positioned in a straight line along the rotational axis of the second connector.

6 Claims, 11 Drawing Sheets

(51) Int. Cl.
  *H01F 38/00* (2006.01)
  *H02J 50/10* (2016.01)
  *H02J 50/00* (2016.01)
  *F25D 23/02* (2006.01)
  *H01F 27/25* (2006.01)

(52) U.S. Cl.
  CPC .... *F25D 2323/024* (2013.01); *F25D 2400/40* (2013.01); *H02J 2310/14* (2020.01)

(58) Field of Classification Search
  USPC .......................................................... 307/104
  See application file for complete search history.

(56) References Cited

U.S. PATENT DOCUMENTS

| | | | |
|---|---|---|---|
| 2011/0208353 A1 | 8/2011 | Kjellsson et al. | |
| 2012/0007439 A1* | 1/2012 | Kozakai | H02J 50/70 307/104 |
| 2013/0015719 A1 | 1/2013 | Jung et al. | |
| 2013/0224013 A1* | 8/2013 | De Broe | F01D 25/28 415/213.1 |
| 2014/0001880 A1* | 1/2014 | Herglotz | E05D 11/0081 307/104 |
| 2015/0287527 A1* | 10/2015 | Kasar | H02J 50/90 307/104 |
| 2017/0211875 A1 | 7/2017 | Lee et al. | |
| 2019/0027954 A1* | 1/2019 | Lee | H02J 50/12 |
| 2019/0103219 A1* | 4/2019 | Sakai | A61H 3/00 |
| 2019/0140492 A1* | 5/2019 | Beyer | H04B 5/0037 |

FOREIGN PATENT DOCUMENTS

| | | |
|---|---|---|
| KR | 20120071285 A | 7/2012 |
| KR | 101566282 B1 | 11/2015 |
| KR | 10-1749586 B | 6/2017 |
| KR | 20170084990 A | 7/2017 |
| WO | 2017108114 A1 | 6/2017 |
| WO | 2017195687 A1 | 11/2017 |

OTHER PUBLICATIONS

Chinese First Office Action issued in 201980020155.2 dated Aug. 10, 2021, 11 pages.

* cited by examiner

WIRELESS POWER TRANSMISSION SYSTEM FOR ROTATING CONNECTOR

CROSS REFERENCE TO RELATED APPLICATION

This application is a 35 U.S.C. 371 National Phase Entry Application from PCT/KR2019/004802, filed Apr. 22, 2019 and designating the United States, which claims the benefit of Korean Patent Application No. 10-2018-0048412 filed on Apr. 26, 2018, the disclosures of which are incorporated herein by reference in their entireties.

TECHNICAL FIELD

The present invention relates to a wireless power transmission system, and more particularly, to a wireless power transmission system which is applicable to rotating connectors such as a refrigerator door, a robot joint, and the like.

BACKGROUND ART

Recently, as the efficiency of wireless power transmission has improved, wireless power transmission functions have been applied to various electronic devices. In particular, since portable devices such as smartphones, notebooks, and note pads require frequent charging, the application of wireless power transmission technology is being expanded so as to provide convenience to a user.

Meanwhile, in latest refrigerators, a function of electronic device such as a display is added to a door, and thus electric power is supplied from a refrigerator body to the door. The refrigerator supplies power from the refrigerator body to a refrigerator door through an electric wire.

In this case, it is often the case that the refrigerator door is separated from the refrigerator body for installation or transportation of the refrigerator. In this case, since the refrigerator body and the refrigerator door are connected by the electric wire, a separation process is complicated such that a great deal of time is consumed in the separation process.

In addition, recent robots, such as humanoids, are provided with a plurality of joints so as to control minute movements as well as robots for an industrial use or a medical use. Here, a joint part has a pair of connectors of which one connector supplies electric power to the other connector. The electric power is supplied through an electric wire.

In this case, in order to repair the robot, there occurs a case in which the joints are separated. In this case, since the connector of the joint is connected by the electric wire, a separation process is complicated such that a great deal of time is consumed in the separation process.

DISCLOSURE

Technical Problem

The present invention is directed to providing a wireless power transmission system for a rotating connector which is capable of transmitting wireless power between rotating connectors that each have a rotatable one side.

Technical Solution

One aspect of the present invention provides a wireless power transmission system for a rotating connector, which includes a wireless power transmission module and a wireless power reception module. The wireless power transmission module may include a first magnetic core and a first coil, may be provided in a first connector which is fixed, and may be configured to generate a magnetic field using electric power of the first connector to transmit wireless power. The wireless power reception module may include a second magnetic core and a second coil, may be provided in a second connector which is rotatably connected to the first connector, and may be configured to receive the transmitted wireless power to supply the received wireless power to the second connector. In this case, the first magnetic core and the second magnetic core may be disposed collinearly on a rotational axis of the second connector.

Here, each of the first magnetic core and the second magnetic core may have a bar shape having a predetermined length, and the first coil and the second coil may be wound around outer circumferential surfaces of the first magnetic core and the second magnetic core in a length direction, respectively. In this case, each of the first magnetic core and the second magnetic core may include one or more of ferrite and an amorphous ribbon.

When the wireless power transmission system for a rotating connector of the present invention is applied to a revolving door type refrigerator, the first connector may be a hinge for a door which is provided in a lower portion of a refrigerator body, and the wireless power transmission module may be embedded in the hinge for a door and may generate the magnetic field using electric power of the refrigerator body. In this case, the second connector may be a refrigerator door, and the wireless power reception module may be embedded in the refrigerator door and may receive the transmitted wireless power to supply the received wireless power to the refrigerator door.

In addition, the wireless power transmission system for a rotating connector may further include an alignment part configured to align positions of the wireless power reception module and the wireless power transmission module.

In addition, the hinge for a door may include a hollow into which the first magnetic core is inserted. Here, the alignment part may include a groove provided in a lower surface of the hollow and an accommodation portion provided collinearly with the groove in the refrigerator door.

In this case, one side of the first magnetic core may be inserted into the groove, and the second magnetic core may be inserted into the accommodation portion. Here, a non-magnetic insulator may be provided in the hollow of the hinge for a door.

When the wireless power transmission system for a rotating connector of the present invention is applied to a joint of a robot, the first connector may be a robot body, and the wireless power transmission module may be embedded in the robot body and may generate the magnetic field using electric power of the robot body. In this case, the second connector may be a first joint inserted into the robot body, and the wireless power reception module may be embedded in the first joint and may receive the transmitted wireless power to supply the received wireless power to the first joint.

Here, the robot body and the first joint may be provided with openings collinear with the first magnetic core and the second magnetic core, respectively.

In this case, the first joint may be provided with a protrusion on a portion connected to the robot body and engagement members provided on an outer circumferential surface of the protrusion in a direction perpendicular to the rotational axis. The robot body may be provided with a groove into which the protrusion is inserted and accommodation portions provided in both side walls of the groove to accommodate the engagement members.

In addition, the first connector may be a first joint connected to a robot body, and the wireless power transmission module may be embedded in the first joint and may generate the magnetic field using electric power of the first joint supplied from the robot body. In this case, the second connector may be a second joint connected to the first joint, and the wireless power reception module may be embedded in the second joint and may receive the transmitted wireless power to supply the received wireless power to the second joint.

Here, the first joint and the second joint may be provided with openings collinear with the first magnetic core and the second magnetic core, respectively.

In this case, the first joint may be provided with a first end portion connected to the second joint, and the second joint may be provided with a second end portion having a shape corresponding to a shape of the first end portion. The second joint may be provided with engagement members protruding from both sides with respect to the rotational axis toward the first end portion. The first joint may be provided with accommodation portions in which the engagement members are accommodated in the first end portion.

Meanwhile, according to the present invention, a wireless power transmission system for a rotating connector, which includes a wireless power transmission module and a wireless power reception module, is provided. The wireless power transmission module may include a first magnetic core and a first coil, may be provided in a first connector which is fixed, and may be configured to generate a magnetic field using electric power of the first connector to transmit wireless power. The wireless power reception module may include a second magnetic core and a second coil, may be provided in a second connector which is rotatably connected to the first connector, and may be configured to receive the transmitted wireless power to supply the received wireless power to the second connector Here, one of the first magnetic core and the second magnetic core may be inserted into and disposed in an inner circumference of the other one thereof, a corresponding coil may be wound around an inner circumference of the one magnetic core, and a corresponding coil may be wound around an outer circumference of the other magnetic core.

Advantageous Effects

In accordance with the present invention, a wireless power transmission module is embedded in a first connector which is fixed, and a wireless power reception module is embedded in a second connector which is rotatable so that wireless power can be transmitted between the first connector and the second connector. Consequently, since there is no need for a power cable between the first connector and the second connector, separation can be easily performed and work efficiency can be improved.

In addition, in accordance with the present invention, the wireless power transmission module and the wireless power reception module are formed using magnetic cores so that an overall size of the wireless power transmission module and the wireless power reception module can be reduced and high electric power can be transmitted.

In addition, in accordance with the present invention, since positions of the wireless power reception module and the wireless power transmission module are aligned through an alignment part, there is no impedance fluctuation according to the positions so that the electric power can be transmitted with the highest efficiency and thus high transmission efficiency of the wireless power can be implemented.

MODES OF THE INVENTION

Hereinafter, embodiments of the present invention will be fully described in detail which is suitable for easy implementation by those skilled in the art to which the present invention pertains with reference to the accompanying drawings. The present invention may be implemented in various different forms, and thus it is not limited to embodiments which will be described herein. In the drawings, some portions not related to the description will be omitted in order to clearly describe the present invention, and the same or similar reference numerals are given to the same or similar components throughout this disclosure.

Figure 1:
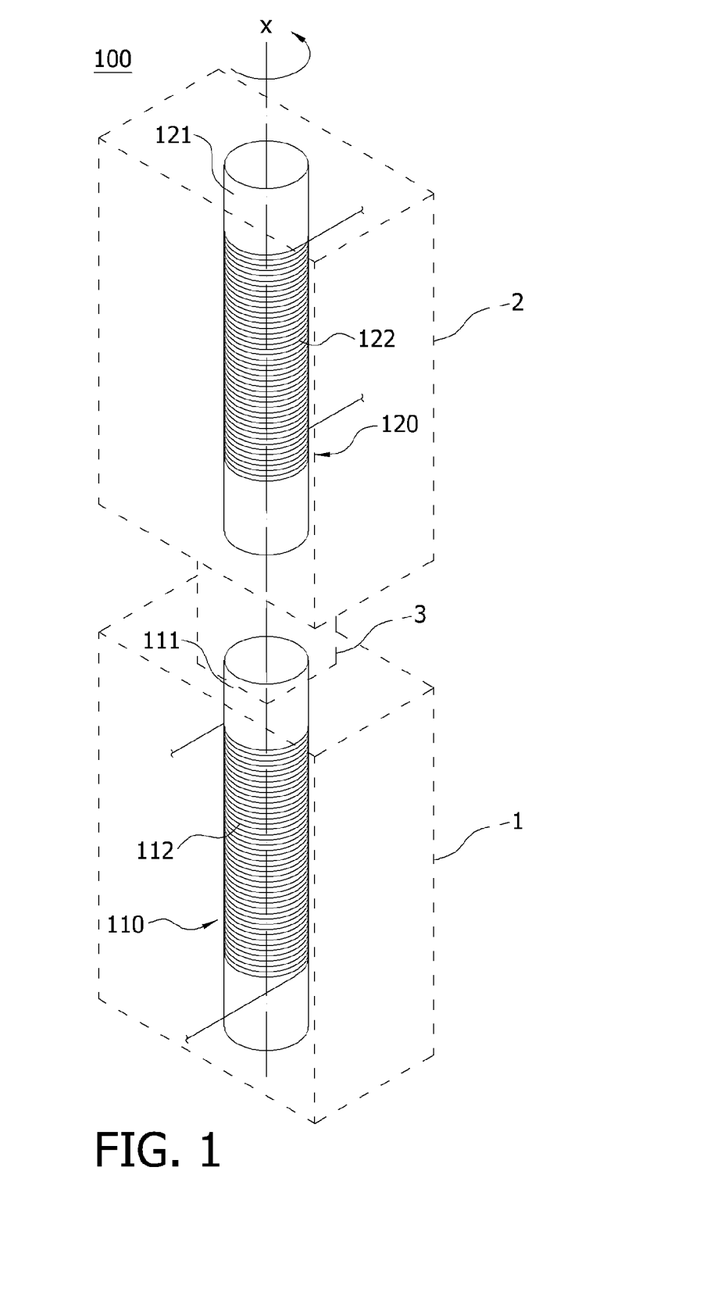
FIG. 1 is a schematic diagram illustrating a wireless power transmission system for a rotating connector according to one embodiment of the present invention.

A wireless power transmission system 100 for a rotating connector according to one embodiment of the present invention is applicable to a rotating connector. As shown in FIG. 1, the wireless power transmission system 100 for a rotating connector includes a wireless power transmission module 110 and a wireless power reception module 120.

In the present invention, the rotating connector may be a joint of a rotating door refrigerator or a robot. Here, the rotating connector may include a first connector 1, a second connector 2, and an engagement part 3. The first connector 1 may be a fixed connector, and the second connector 2 may be a connector which is connected to the first connector 1 through the engagement part 3 to be rotated. That is, the second connector 2 may be rotated with respect to the first connector 1 about a rotational axis x.

In this case, the wireless power transmission module 110 may be provided in the first connector 1 which supplies electric power, and the wireless power reception module 120 may be provided in the second connector 2 which is capable of receiving the electric power transmitted from the first connector 1 in a wireless manner That is, the wireless power transmission module 110 and the wireless power reception module 120 are for generating a magnetic field using the electric power supplied from the first connector 1 and transmitting or receiving the electric power using the magnetic field in a wireless manner.

That is, the wireless power transmission module 110 is embedded in the first connector 1 and generates a magnetic field using electric power supplied from the outside to transmit the electric power together with the magnetic field in a wireless manner. The wireless power reception module 120 may be embedded in the second connector 2, may receive the electric power transmitted from the wireless power transmission module 110, and may generate an electromotive force to produce required electric power. In the present invention, the electric power produced through the wireless power transmission module 110 may be used for charging a battery embedded in the second connector 2 or transmitted in real time to be used directly as electric power for driving the second connector 2. The above-described wireless power transmission method is known, and thus a detailed description thereof will be omitted herein.

In this case, the wireless power transmission module 110 and the wireless power reception module 120 which are applied to the present invention may have high degrees of freedom in position and distance to be capable of transmitting high power that is greater than or equal to 10 W and is in the range of several tens of watts to several KW and may be formed in an electromagnet or solenoid form so as to reduce an overall size.

Specifically, as shown in FIG. 1, the wireless power transmission module 110 may be formed in a shape including a bar-shaped first magnetic core 111 having a predetermined length and a first coil 112 wound around an outer circumferential surface of the first magnetic core 111 in a length direction. In addition, the wireless power reception module 120 may be formed in a shape including a bar-shaped second magnetic core 121 having a predetermined length and a second coil 122 wound around an outer circumferential surface of the second magnetic core 121 in a length direction.

In this case, the second magnetic core 121 is disposed collinearly with the first magnetic core 111 on the rotational axis x of the second connector 2.

Consequently, a main magnetic line of force formed on both ends of the first magnetic core 111 may be smoothly introduced into ends of the second magnetic core 121 so that a loss may be reduced, and thus overall power transmission efficiency can be improve.

As described above, in the wireless power transmission system 100 for a rotating connector according to the present invention, both the wireless power transmission module 110 and the wireless power reception module 120 are implemented in an electromagnet or solenoid manner Thus, since a relatively narrow installation space is required as compared with that required in a flat coil method, a pair of rotating connectors may be installed in a narrow place.

Here, each of the first coil 112 and the second coil 122 may be a conductive member having a predetermined line diameter and a predetermined length. For example, the conductive member may be formed of copper, but the present invention is not limited thereto, and any known material used for a coil may be applied.

In addition, the number of turns of the first coil 112 and the second coil 122 wound around the first magnetic core 111 and the second magnetic core 121, respectively, may be appropriately varied according to desired transmission power.

In addition, the first magnetic core 111 and the second magnetic core 121 may be appropriately modified according to an applied frequency, and a material having high magnetic permeability, a low loss of permeability, and a high Q value may be used, and a material having a high saturation magnetic flux density may be used. For example, each of the first magnetic core 111 and the second magnetic core 121 may be made of a magnetic material including one or more among Ni—Zn ferrite, Mn—Zn ferrite, and an amorphous ribbon. However, the material of each of the first magnetic core 111 and the second magnetic core 121 is not limited thereto, and any known magnetic material may be appropriately used.

In addition, each of the first magnetic core 111 and the second magnetic core 121 is shown and described as having a cylindrical shape, but the present invention is not limited thereto, and each of the first magnetic core 111 and the second magnetic core 121 may have a quadrangular bar shape but a shape of each thereof is not particularly limited.

Figure 2:
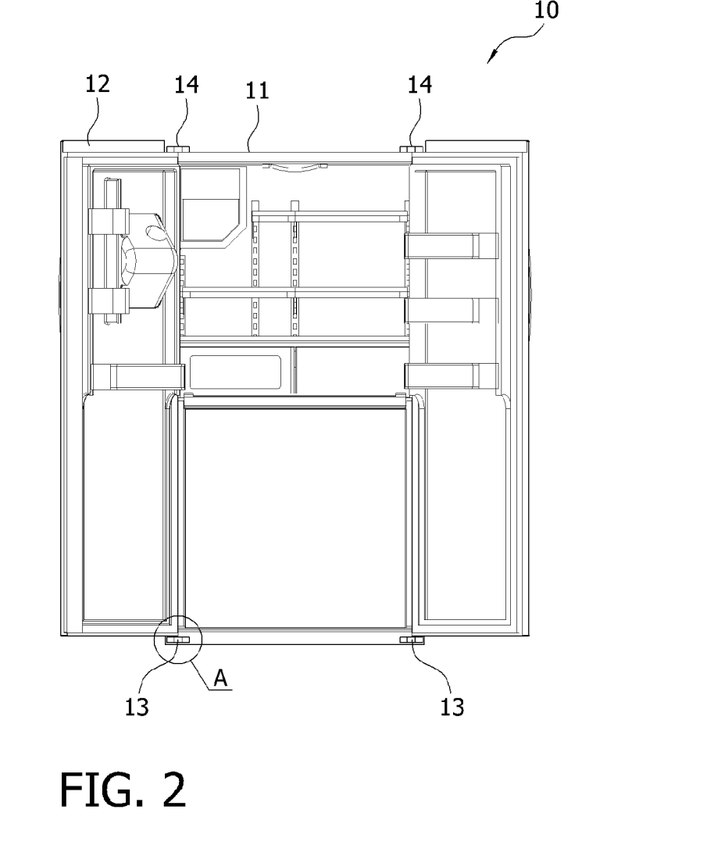
FIG. 2 is a diagram illustrating a refrigerator to which the wireless power transmission system for a rotating connector of FIG. 1 is applied.

Meanwhile, as shown in FIG. 2, the wireless power transmission system 100 for a rotating connector according to the embodiment of the present invention may be applied to a refrigerator 10 having rotating doors, such as a two-door type refrigerator. Here, in the refrigerator 10, a function of an electronic device such as a display is provided in a refrigerator door 12. In particular, the refrigerator 10 may include any type in which the refrigerator door 12 is coupled to a refrigerator body 11 through refrigerator hinges 13 and 14.

In this case, the wireless power transmission module 110 and the wireless power reception module 120 are for generating a magnetic field using electric power supplied from the refrigerator body 11 and transmitting or receiving the electric power using the magnetic field in a wireless manner.

Here, the electric power produced through the wireless power transmission module 110 may be used for charging a battery embedded in the refrigerator door 12 or transmitted in real time to be used directly as electric power for driving the refrigerator door 12.

The refrigerator 10 may be in the form in which the refrigerator body 11 and the refrigerator door 12 are coupled through the refrigerator hinge 13 at a lower end of the refrigerator body 11 and the refrigerator hinge 14 at an upper end thereof. That is, the refrigerator hinge 13 may be inserted into a coupling groove 12a of the refrigerator door 12. In this case, the refrigerator hinge 13 may be in the form of being provided in and fixed to the refrigerator body 11, and the refrigerator hinge 14 may be in the form of being pivoted upward or laterally.

Thus, when the refrigerator door 12 is separated from the refrigerator body 11, in a state in which the refrigerator hinge 14 is pivoted upward or laterally, the refrigerator door 12 may be moved upward to be easily separated from the refrigerator body 11.

In this case, as shown in FIG. 2, the wireless power transmission system 100 for a rotating connector according to the present invention may be embedded in the refrigerator hinge 13 and the refrigerator door 12 which are provided in a lower end of the refrigerator 10.

Figure 3:
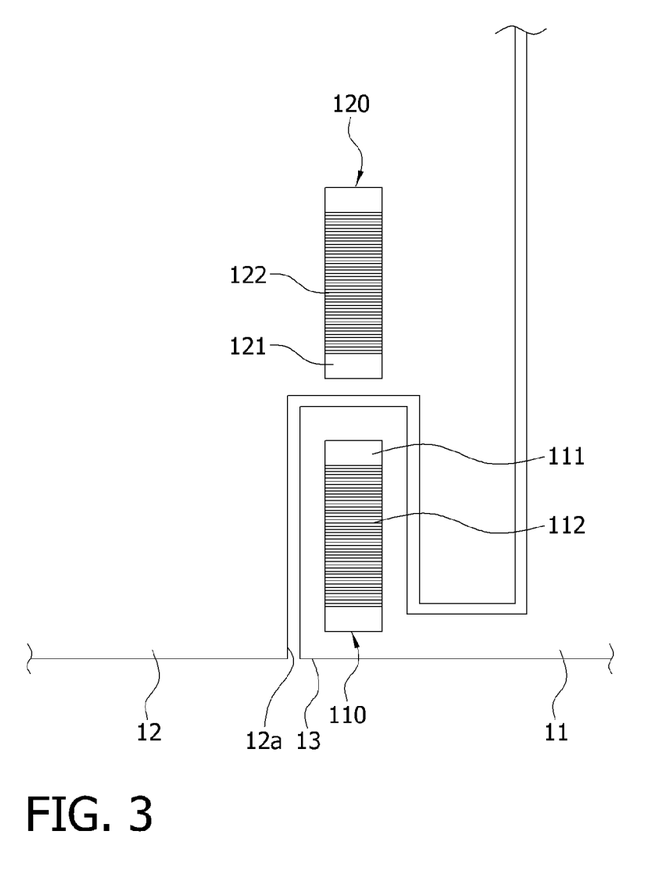
FIG. 3 is a diagram illustrating a state in which the wireless power transmission system for a rotating connector of FIG. 1 is applied to the refrigerator.

As shown in FIG. 3, the wireless power transmission module 110 may be in the form of being embedded in and integrated with the refrigerator hinge 13 provided in a lower portion of the refrigerator body 11. The wireless power reception module 120 may be in the form of being embedded in and integrated with a lower portion of the refrigerator door 12 coupled to the refrigerator hinge 13.

Here, the first magnetic core 111 may be disposed within the refrigerator hinge 13 in the length direction, and the second magnetic core 121 may be disposed within the refrigerator door 12 in the length direction. In this case, the second magnetic core 121 may be vertically disposed collinearly with the first magnetic core 111.

Consequently, a main magnetic line of force formed on both ends of the first magnetic core 111 may be smoothly introduced into ends of the second magnetic core 121 so that a loss may be reduced to improve overall power transmission efficiency.

As described above, in the wireless power transmission system 100 for a rotating connector according to the present invention, both the wireless power transmission module 110 and the wireless power reception module 120 are implemented in an electromagnet or solenoid manner Thus, since a relatively narrow installation space is required, the wireless power transmission module 110 may be installed in a narrow place such as an interior of the refrigerator hinge 13.

Thus, when the refrigerator door 12 is coupled to the refrigerator hinge 13, wireless power is transmitted from the wireless power transmission module 110 and the wireless power reception module 120 receives the transmitted wireless power so that electric power required for the refrigerator door 12 may be supplied from the refrigerator body 11 without a separate power cable in a non-contact manner Therefore, when the refrigerator door 12 is separated from the refrigerator body 11, since a procedure for separating the power cable is omitted, efficiency of the separation operation may be improved.

Figure 4:
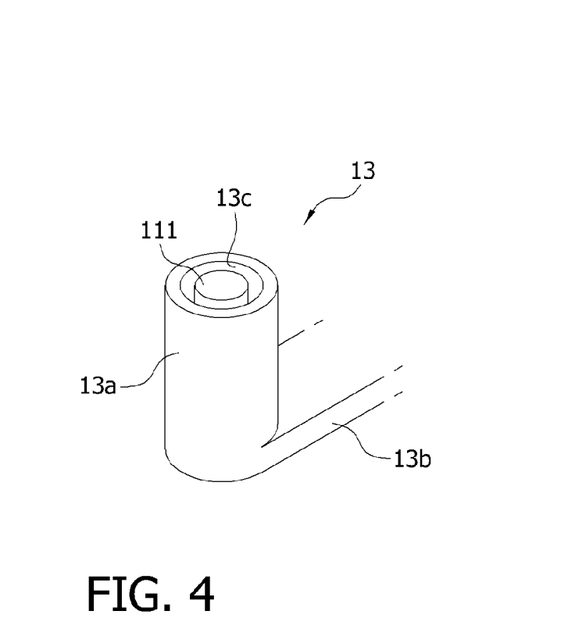
FIG. 4 is a diagram illustrating a state in which a wireless power transmission module of FIG. 3 is embedded in a refrigerator hinge.

In this case, when the refrigerator hinge 13 is made of a conductor such as metal and, particularly, when a hinge shaft 13a provided with the first magnetic core 111 is made of a conductor, as shown in FIG. 4, an opening 13c may be provided in the hinge shaft 13a. Here, the refrigerator hinge 13 may include the hinge shaft 13a and a hinge plate 13b connected to the refrigerator body 11.

As described above, when the refrigerator hinge 13 is made of a conductor, a magnetic field generated from the first magnetic core 111 may be introduced into the refrigerator hinge 13. Therefore, efficiency of the wireless power, which is transmitted from the wireless power transmission module 110 to the wireless power reception module 120 through the refrigerator hinge 13, may be reduced.

In order to solve the above problem, in the present embodiment, the opening 13c may be provided in an upper surface of the hinge shaft 13a of the refrigerator hinge 13. Consequently, the magnetic field generated from the wireless power transmission module 110 may be effectively transmitted to the wireless power reception module 120 without electrical or magnetic interference due to the refrigerator hinge 13.

Meanwhile, the wireless power transmission system 100 for a rotating connector according to the present invention may further include alignment parts 130 and 130a for aligning positions of the wireless power transmission module 110 and the wireless power reception module 120. For example, the alignment parts 130 and 130a may include a groove 130 provided in the refrigerator hinge 13 and an accommodation portion 130a provided in the refrigerator door 12.

Figure 5:
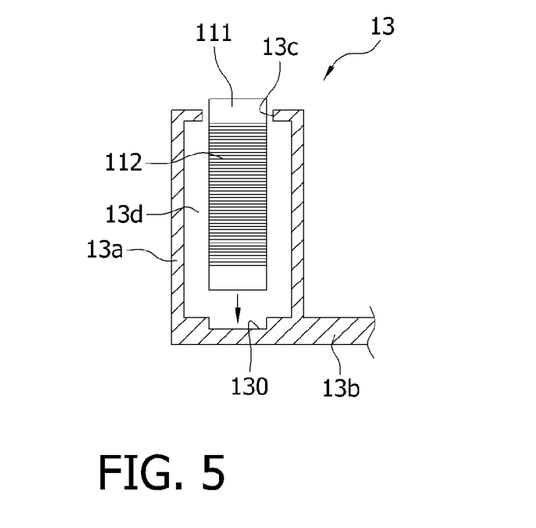
FIG. 5 is a diagram illustrating a process in which the wireless power transmission module of FIG. 4 is inserted into the refrigerator hinge.

Here, as shown in FIG. 5, the refrigerator hinge 13 may be provided with a hollow 13d for accommodating the first magnetic core 111 in the hinge shaft 13a. The first magnetic core 111 may be inserted into the hollow 13d through the opening 13c.

The groove 130, which is one of the alignment parts, may be provided in a lower surface of the hollow 13d. In this case, after the first magnetic core 111 is inserted into the hollow 13d through the opening 13c, one side of the first magnetic core 111 may be inserted into the groove 130. Thus, the first magnetic core 111 may be vertically fixed in the hollow 13d.

Here, when the hinge shaft 13a of the refrigerator hinge 13 is a conductor, a non-magnetic insulating layer may be provided between the first magnetic core 111 and the groove 130. Consequently, electrical or magnetic interference between the first magnetic core 111 and the refrigerator hinge 13 may be prevented.

Figure 6:
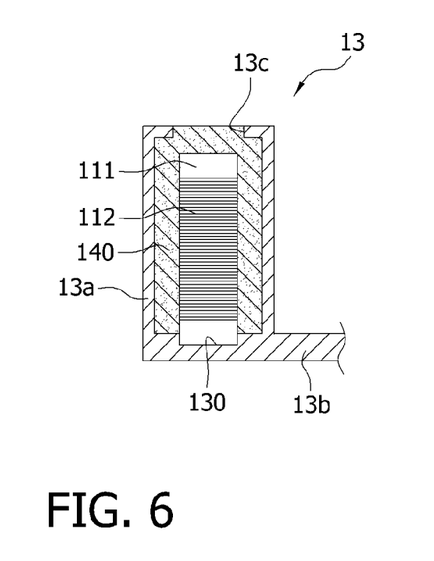
FIG. 6 is a cross-sectional view of FIG. 4.

As shown in FIG. 6, a non-magnetic insulator 140 may be provided in the hollow 13d of the refrigerator hinge 13. The non-magnetic insulator 140 may fix the first magnetic core 111 in the hollow 13d. In particular, when the refrigerator hinge 13 is a conductor, the non-magnetic insulator 140 may suppress electrical or magnetic interference between the refrigerator hinge 13 and the first magnetic core 111.

Figure 7:
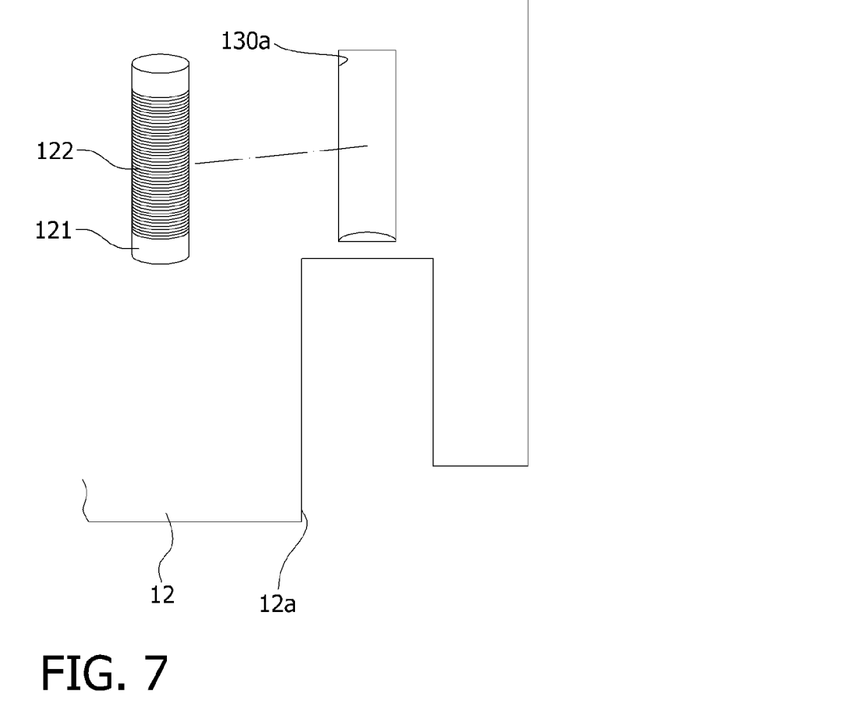
FIG. 7 is a diagram illustrating a process in which a wireless power reception module of FIG. 3 is inserted into a refrigerator door.

As shown in FIG. 7, the accommodation portion 130a, which is the other one of the alignment parts, may be provided at one side of the refrigerator door 12. Here, the accommodation portion 130a may be provided collinearly with the groove 130 of the refrigerator hinge 13.

Figure 8:
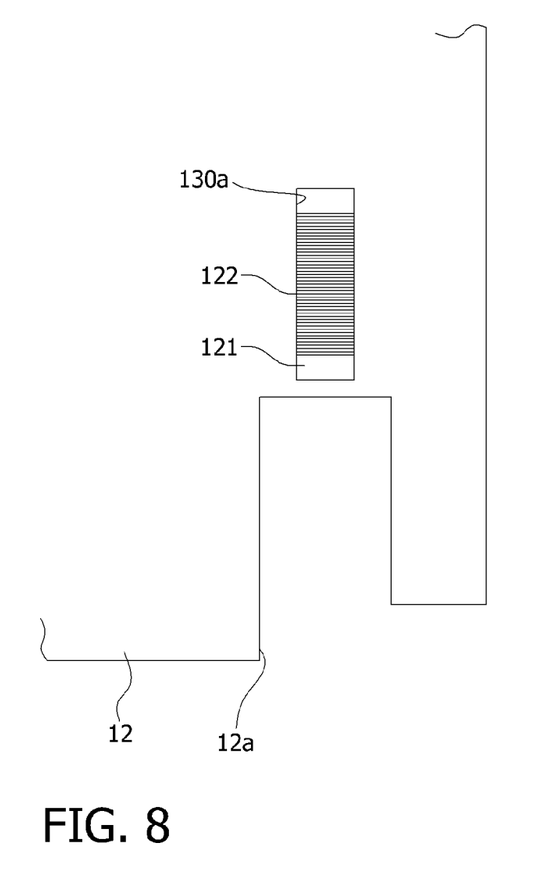
FIG. 8 is a diagram illustrating a state in which the wireless power reception module of FIG. 7 is inserted into the refrigerator door.

In this case, as shown in FIG. 8, the second magnetic core 121 may be inserted into and fixed to the accommodation portion 130a. Here, the accommodation portion 130a may be provided in one inner side surface of the refrigerator door 12. In addition, when the interior of the refrigerator door 12 includes a hollow, the accommodation portion 130a may be provided in the form of a frame having a shape similar to the shape of the first magnetic core 111.

Since the groove 130 of the refrigerator hinge 13 and the accommodation portion 130a of the refrigerator door 12 may be manufactured to have a predetermined standard in design, positions of the first magnetic core 111 and the second magnetic core 121 inserted into the groove 130 and the accommodation portion 130a may be consistently aligned.

Therefore, since the wireless power transmission module 110 and the wireless power reception module 120 may maintain an aligned state through the alignment parts 130 and 130a, there is no need to consider impedance fluctuation according to the position and, even when the refrigerator door 12 is pivoted, stable power transmission may be performed.

Figure 9:
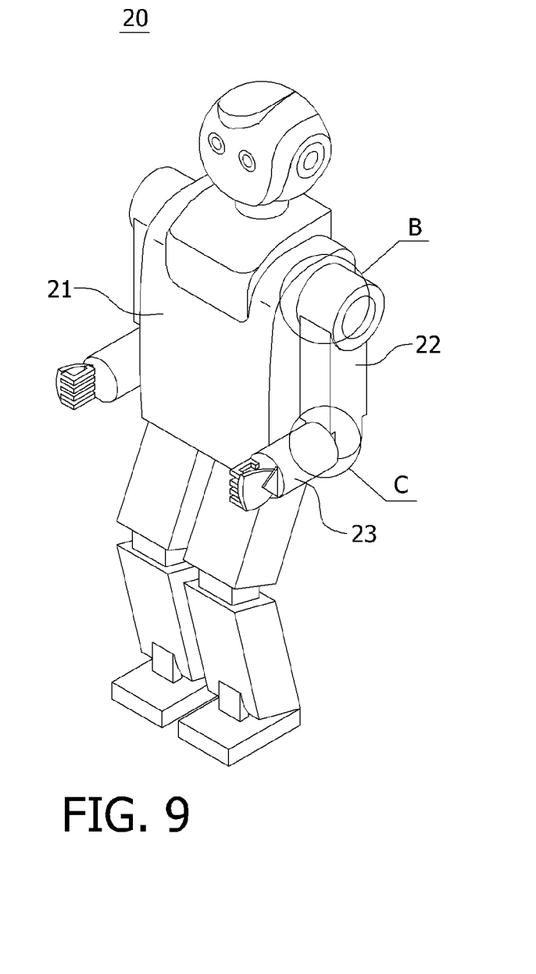
FIG. 9 is a diagram illustrating a robot to which the wireless power transmission system for a rotating connector of FIG. 1 is applied.

Meanwhile, as shown in FIG. 9, the wireless power transmission system 100 for a rotating connector according to the embodiment of the present invention may be applied to a robot 20 including rotatable joints. Here, the robot 20 may be an industrial robot, a medical robot, a recycling robot, or a humanoid robot. In particular, the robot 20 may be a robot including a plurality of rotatable joints 22 and 23.

In this case, the wireless power transmission module 110 and the wireless power reception module 120 are for generating a magnetic field using electric power supplied from a robot body 21 or electric power supplied from the robot body 21 to the first joint 22 and transmitting or receiving the electric power using the magnetic field in a wireless manner.

Here, the electric power produced through the wireless power transmission module 110 may be used for charging a battery embedded in the first joint 22 or the second joint 23 or transmitted in real time to be used directly as electric power for driving the first joint 22 or the second joint 23.

The robot 20 includes the robot body 21, the first joint 22, and the second joint 23. The first joint 22 may be a joint which is connected to the robot body 21 and may be a robot arm or a robot leg. The second joint 23 may be a joint which is connected to the first joint 22 and may be connected to a robot hand or a robot foot.

Here, the first joint 22 is rotatable about a connection shaft to the robot body 21. That is, the first joint 22 may be connected to a left side or a right side of the robot body 21 to be rotated forward or rearward from the robot body 21.

The second joint 23 is rotatable about a connection shaft to the first joint 22. That is, the second joint 23 may be connected to an opposite side of the robot body 21 with respect to the first joint 22 to be rotated forward or rearward from the first joint 22.

In this case, for example, as in a portion B shown in FIG. 9, the wireless power transmission system 100 for a rotating connector according to the present invention may be embedded in the robot body 21 and the first joint 22.

Figure 10:
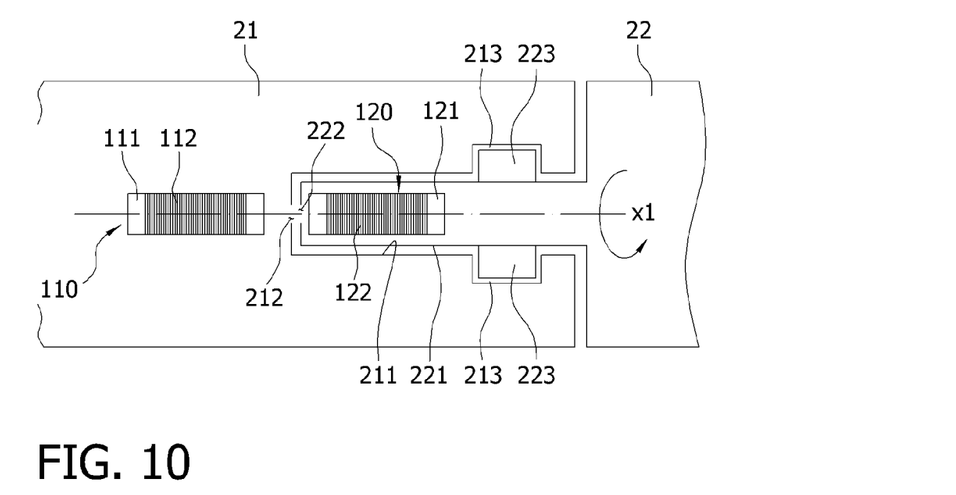
FIG. 10 is a diagram illustrating a state in which the wireless power transmission system for a rotating connector of FIG. 1 is applied to a body and a joint of the robot.

As shown in FIG. 10, the wireless power transmission module 110 may be in the form of being embedded in and integrated with a connection portion of the first joint 22 in the robot body 21. The wireless power reception module 120 may be in the form of being embedded in and integrated with the first joint 22 which is inserted into the robot body 21.

In this case, a protrusion 221 may be provided in the first joint 22 to couple the first joint 22 to a portion which is connected to the robot body 21. The robot body 21 may be provided with a groove 211 into which the protrusion 221 of the first joint 22 is inserted. That is, the protrusion 221 of the first joint 22 is inserted into the groove 211 so that the first joint 22 may be connected to the robot body 21.

An engagement member 223 may be provided on an outer circumferential surface of the protrusion 221 in a direction perpendicular to a rotational axis x1. An accommodation portion 213 in which the engagement member 223 is accommodated may be provided in both side walls of the groove 211. That is, the engagement member 223 is inserted into the accommodation portion 213 so that the first joint 22 is not separated from the robot body 21.

The engagement member 223 may be connected to a driving part (not shown), which is provided in the robot body 21, to be rotated. Here, the driving part may be a motor or a gear. Accordingly, the engagement member 223 may be rotated in the accommodation portion 213. Therefore, the first joint 22 may be rotated with respect to the robot body 21 about the rotational axis x1.

Here, the first magnetic core 111 may be disposed at a position corresponding to the protrusion 221 in a width direction of the robot body 21, and the second magnetic core 121 may be disposed in the protrusion 221 in a width direction thereof. In this case, the second magnetic core 121 may be disposed collinearly with the first magnetic core 111 on the rotational axis x1 of the first joint 22.

Consequently, a main magnetic line of force formed on both ends of the first magnetic core 111 may be smoothly introduced into ends of the second magnetic core 121 so that a loss may be reduced to improve overall power transmission efficiency.

As described above, in the wireless power transmission system 100 for a rotating connector according to the present invention, both the wireless power transmission module 110 and the wireless power reception module 120 are implemented in an electromagnet or solenoid manner Thus, since a relatively narrow installation space is required, the wireless power reception module 120 may be installed in a narrow place such as an interior of the protrusion 221 of the first joint 22.

Thus, when the first joint 22 is coupled to the robot body 21, wireless power is transmitted from the wireless power transmission module 110 and the wireless power reception module 120 receives the transmitted wireless power so that electric power required for the first joint 22 may be supplied from the robot body 21 without a separate power cable in a non-contact manner. Therefore, when the first joint 22 is separated from the robot body 21, since a procedure for separating the power cable is omitted, efficiency of the separation operation may be improved.

In this case, since each of the robot body 21 and the first joint 22 is made of a conductor such as metal, the robot body 21 and the first joint 22 are provided with openings 212 and 222 which are collinear with the first magnetic core 111 and the second magnetic core 121.

As described above, since each of the robot body 21 and the first joint 22 is made of a conductor, a magnetic field generated from the first magnetic core 111 may be introduced along a surface of the robot body 21 or the first joint 22. Therefore, efficiency of the wireless power, which is transmitted from the wireless power transmission module 110 to the wireless power reception module 120, may be reduced.

In order to solve the above problem, in the present embodiment, the opening 212 and the opening 222 may be provided to allow the first magnetic core 111 to face the second magnetic core 121 in the groove 211 of the robot body 21 and the protrusion 221 of the first joint 22.

Consequently, the magnetic field generated from the wireless power transmission module 110 may be effectively transmitted to the wireless power reception module 120 without electrical or magnetic interference due to the robot body 21 or the first joint 22.

As another example, as in a portion C shown in FIG. 9, the wireless power transmission system 100 for a rotating connector according to the present invention may be embedded in the first joint 22 and the second joint 23.

Figure 11:
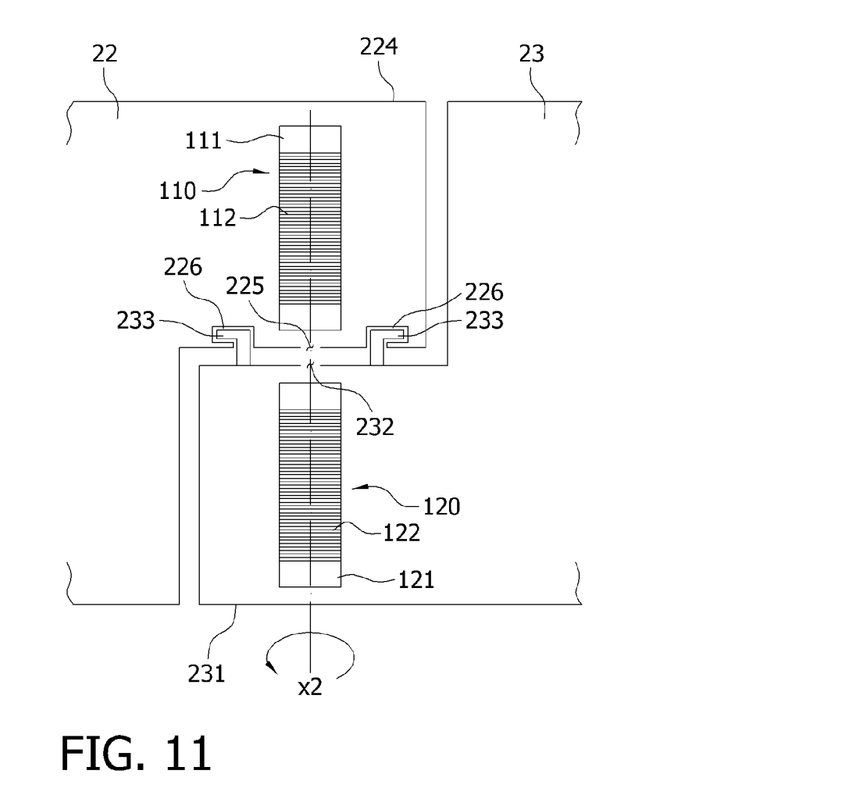
FIG. 11 is a diagram illustrating a state in which the wireless power transmission system for a rotating connector of FIG. 1 is applied between the joints of the robot.

As shown in FIG. 11, the wireless power transmission module 110 may be in the form of being embedded in and integrated with the first joint 22. The wireless power reception module 120 may be in the form of being embedded in and integrated with the second joint 23 which is connected to the first joint 22.

In this case, the first joint 22 may be provided with a first end portion 224 connected to the second joint 23 at a side opposite to a side to which the robot body 21 is connected. A second end portion 231 having a shape corresponding to a shape of the first end portion 224 may be provided in one end of the second joint 23. That is, the first end portion 224 of the first joint 22 is coupled to face the second end portion 231 of the second joint 23 so that the second joint 23 may be connected to the first joint 22.

The second joint 23 may be provided with engagement members 233 protruding from both sides with respect to a rotational axis x2 toward the first end portion 224. The first joint 22 may be provided with accommodation portions 226 in which the engagement members 233 are accommodated in the first end portion 224. That is, the engagement members 233 are inserted into the accommodation portions 226 so that the second joint 23 is not separated from the first joint 22.

The engagement members 233 may be connected to a driving part (not shown), which is provided in the first joint 22, to be rotated. Here, the driving part may be a motor or a gear. Accordingly, the engagement members 233 may be rotated in the accommodation portions 226. Therefore, the second joint 23 may be rotated with respect to the first joint 22 about the rotational axis x2.

Here, the first magnetic core 111 may be disposed in the first end portion 224 in a width direction of the first end portion 224, and the second magnetic core 121 may be disposed in the second end portion 231 in a width direction thereof. In this case, the second magnetic core 121 may be disposed collinearly with the first magnetic core 111 on the rotational axis x2 of the second joint 23.

Consequently, a main magnetic line of force formed on both ends of the first magnetic core 111 may be smoothly introduced into ends of the second magnetic core 121 so that a loss may be reduced to improve overall power transmission efficiency.

As described above, in the wireless power transmission system 100 for a rotating connector according to the present invention, both the wireless power transmission module 110 and the wireless power reception module 120 are implemented in an electromagnet or solenoid manner Thus, since a relatively narrow installation space is required, the wireless power transmission module 110 and the wireless power reception module 120 may be installed in narrow places such as interiors of the first end portion 224 of the first joint 22 and the second end portion 231 of the second joint 23.

Thus, when the second joint 23 is coupled to the first joint 22, wireless power is transmitted from the wireless power transmission module 110 and the wireless power reception module 120 receives the transmitted wireless power so that electric power required for the second joint 23 may be supplied from the first joint 22 without a separate power cable in a non-contact manner Therefore, when the second joint 23 is separated from the first joint 22, since a procedure for separating the power cable is omitted, efficiency of the separation operation may be improved.

In this case, since each of the first joint 22 and the second joint 23 is made of a conductor such as metal, the first joint 22 and the second joint 23 are provided with openings 225 and 232 which are collinear with the first magnetic core 111 and the second magnetic core 121.

As described above, since each of the first joint 22 and the second joint 23 is made of a conductor, a magnetic field generated from the first magnetic core 111 may be introduced along a surface of the first joint 22 or the second joint 23. Therefore, efficiency of the wireless power, which is transmitted from the wireless power transmission module 110 to the wireless power reception module 120, may be reduced.

In order to solve the above problem, in the present embodiment, the opening 225 and the opening 232 may be provided to allow the first magnetic core 111 to face the second magnetic core 121 on facing surfaces between the first end portion 224 of the first joint 22 and the second end portion 231 of the second end portion 231.

Consequently, the magnetic field generated from the wireless power transmission module 110 may be effectively transmitted to the wireless power reception module 120 without electrical or magnetic interference due to the first joint 22 or the second joint 23.

Figure 12:
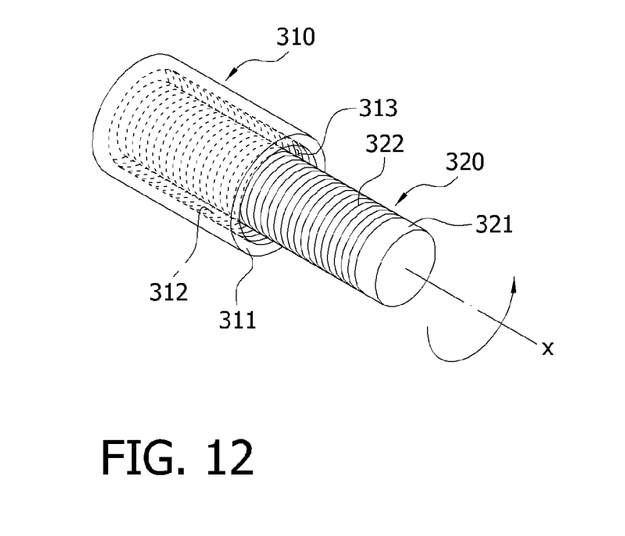
FIG. 12 is a schematic diagram illustrating a wireless power transmission system for a rotating connector according to another embodiment of the present invention.

Meanwhile, as shown in FIG. 12, in a wireless power transmission system 300 for a rotating connector according to an embodiment of the present invention, one magnetic core 321 may be inserted into another magnetic core 311 about the rotational axis x.

For example, a wireless power transmission module 310 may include a first cylindrical magnetic core 311 having a hollow 313 and a first coil 312 wound around an inner circumference of the first magnetic core 311. In addition, a wireless power reception module 320 may include a second cylindrical bar-shaped magnetic core 321 having a diameter that is smaller than an inner diameter of the hollow 313 and a second coil 322 wound around an outer circumference of the second magnetic core 321. In this case, the second magnetic core 321 is inserted into and disposed in the inner circumference of the first magnetic core 311.

Consequently, since some regions of the first magnetic core 311 and the second magnetic core 321 overlap, electromagnetic coupling strength between the first magnetic core 311 and the second magnetic core 321 is increased so that efficiency of power transmission in a wireless manner may be further improved.

Here, although the second magnetic core 321 of the wireless power reception module 320 has been illustrated and described as being inserted into and disposed in the inner circumference of the first magnetic core 311 of the wireless power transmission module 310, the present invention is not limited thereto and may be implemented in an opposite manner from the above description. That is, the first magnetic core 311 of the wireless power transmission module 310 may be inserted into and disposed in the inner circumference of the second magnetic core 321 of the wireless power reception module 320, and this is applicable to the following description.

As described above, in the wireless power transmission system 300 for a rotating connector according to the present invention, some portions of the wireless power transmission module 310 and the wireless power reception module 320 are disposed to overlap so that, as compared with the manner shown in FIG. 1 in which the modules are disposed collinearly with each other, efficiency of power transmission may be further improved and efficiency of an installation space may be improved.

Here, the wireless power transmission module 310 may be provided in the first connector 1 which supplies electric power, and the wireless power reception module 320 may be provided in the second connector 2 which is capable of receiving the electric power transmitted from the first connector 1 in a wireless manner.

Figure 13:
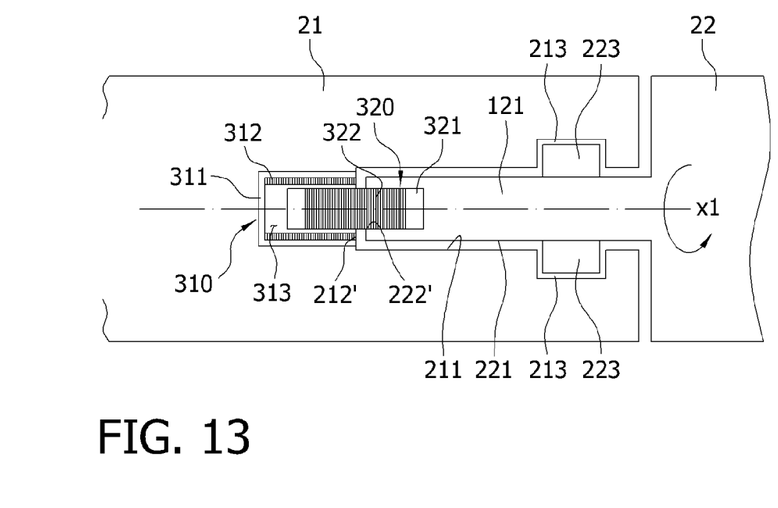
FIG. 13 is a diagram illustrating a state in which the wireless power transmission system for a rotating connector of FIG. 12 is applied to the body and the joint of the robot.

For example, as shown in FIG. 13, the wireless power transmission system 300 for a rotating connector according to the present invention may be embedded in the robot body 21 and the first joint 22.

In this case, the wireless power transmission module 310 may be in the form of being embedded in and integrated with a connection portion of the first joint 22 in the robot body 21. The wireless power reception module 320 may be in the form in which one side is embedded in the first joint 22 inserted into the robot body 21 and the other side protrudes to the outside. Here, the robot body 21 and the first joint 22 are the same as those described with reference to FIG. 10, and thus detailed descriptions thereof will be omitted herein.

The first coil 312 may be wound around the inner circumference of the first magnetic core 311 embedded in the robot body 21. In addition, in the first magnetic core 311, the hollow 313 may be exposed to the outside through an opening 212'.

In addition, the second coil 322 may be wound around the outer circumference of the second magnetic core 321. In addition, one side of the second magnetic core 321 may protrude to the outside of the first joint 22 through an opening 222'.

In this case, the second magnetic core 321 may be inserted into and disposed in the inner circumference of the first magnetic core 311 so as to be concentric with the rotational axis x1. That is, the protruding one side of the second magnetic core 321 may be inserted into the hollow 313 of the first magnetic core 311.

Consequently, electromagnetic coupling strength between the first magnetic core 311 and the second magnetic core 321 is increased so that efficiency of power transmission in a wireless manner may be further improved and efficiency of an installation space may be improved.

Figure 14:
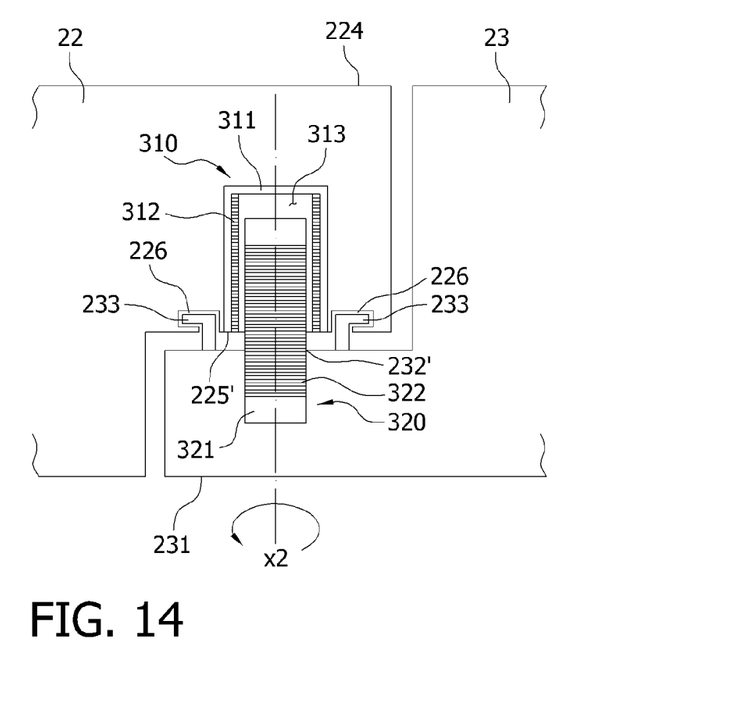
FIG. 14 is a diagram illustrating a state in which the wireless power transmission system for a rotating connector of FIG. 12 is applied between the joints of the robot.

As another example, as shown in FIG. 14, the wireless power transmission system 300 for a rotating connector according to the present invention may be embedded in the first joint 22 and the second joint 23.

In this case, the wireless power transmission module 310 may be in the form of being embedded in and integrated with the first joint 22. The wireless power reception module 320 may be in the form in which one side is embedded in the second joint 23 inserted into the first joint 22 and the other side protrudes to the outside. Here, the first joint 22 and the second joint 23 are the same as those described with reference to FIG. 11, and thus detailed descriptions thereof will be omitted herein.

The first coil 312 may be wound around the inner circumference of the first magnetic core 311 embedded in the first joint 22. In addition, in the first magnetic core 311, the hollow 313 may be exposed to the outside through an opening 225'.

In addition, the second coil 322 may be wound around the outer circumference of the second magnetic core 321. In addition, one side of the second magnetic core 321 may protrude to the outside of the second joint 23 through an opening 232'.

In this case, the second magnetic core 321 may be inserted into and disposed in the inner circumference of the first magnetic core 311 so as to be concentric with the rotational axis x2. That is, the protruding one side of the second magnetic core 321 may be inserted into the hollow 313 of the first magnetic core 311. Consequently, electromagnetic coupling strength between the first magnetic core 311 and the second magnetic core 321 is increased so that efficiency of power transmission in a wireless manner may be further improved and efficiency of an installation space may be improved.

Although the exemplary embodiments of the present invention have been described, the spirit of the present invention is not limited to the exemplary embodiments disclosed herein, and it should be understood that numerous other embodiments can be devised by those skilled in the art that will fall within the same spirit and scope of this disclosure through addition, modification, deletion, supplement, and the like of a component, and also these other embodiments will fall within the spirit and scope of the present invention.

The invention claimed is:

1. A wireless power transmission system for a rotating connector, comprising:
   a wireless power transmission module comprising a first magnetic core and a first coil, embedded in a first connector which is a fixed hinge provided in a lower portion of a refrigerator body, and configured to generate a magnetic field using electric power of the refrigerator body to transmit wireless power;
   a wireless power reception module comprising a second magnetic core and a second coil, embedded in a second connector which is a refrigerator door rotatably connected to the first connector, and configured to receive the transmitted wireless power to supply the received wireless power to the refrigerator door; and
   an alignment part configured to align positions of the wireless power reception module and the wireless power transmission module,
   wherein the first magnetic core and the second magnetic core are disposed collinearly on a rotational axis of the second connector,
   wherein the fixed hinge comprises a hollow into which the first magnetic core is inserted; and
   wherein the alignment part comprises a groove provided in a lower surface of the hollow and an accommodation portion provided collinearly with the groove in the refrigerator door.

2. The wireless power transmission system of claim 1, wherein each of the first magnetic core and the second magnetic core has a bar shape having a predetermined length, and the first coil and the second coil are wound around outer circumferential surfaces of the first magnetic core and the second magnetic core in a length direction, respectively.

3. The wireless power transmission system of claim 1, wherein each of the first magnetic core and the second magnetic core comprises at least one of a ferrite and an amorphous ribbon.

4. The wireless power transmission system of claim 1, wherein:
   one side of the first magnetic core is inserted into the groove; and
   the second magnetic core is inserted into the accommodation portion.

5. The wireless power transmission system of claim 1, wherein a non-magnetic insulator is provided in the hollow of the hinge for a door.

6. The wireless power transmission system of claim 1,
   wherein one of the first magnetic core and the second magnetic core is inserted into and disposed in an inner circumference of the other one thereof,
   a corresponding coil is wound around an inner circumference of the one magnetic core, and
   a corresponding coil is wound around an outer circumference of the other magnetic core.

* * * * *